(12) United States Patent
Holtz et al.

(10) Patent No.: US 9,680,300 B2
(45) Date of Patent: Jun. 13, 2017

(54) HOT SWITCH PROTECTION CIRCUIT

(71) Applicant: Keithley Instruments, Inc., Cleveland, OH (US)

(72) Inventors: Matthew A. Holtz, Solon, OH (US); Gregory Sobolewski, Brecksville, OH (US); Jerold A. Williamson, Twinsburg, OH (US)

(73) Assignee: Keithley Instruments, LLC, Solon, OH (US)

( * ) Notice: Subject to any disclaimer, the term of this patent is extended or adjusted under 35 U.S.C. 154(b) by 114 days.

(21) Appl. No.: 14/258,916

(22) Filed: Apr. 22, 2014

(65) Prior Publication Data
US 2015/0171627 A1    Jun. 18, 2015

Related U.S. Application Data

(60) Provisional application No. 61/915,910, filed on Dec. 13, 2013.

(51) Int. Cl.
*H02H 9/04*    (2006.01)
*H01H 9/54*    (2006.01)

(52) U.S. Cl.
CPC ............ *H02H 9/041* (2013.01); *H01H 9/542* (2013.01)

(58) Field of Classification Search
CPC ............................. H01H 9/542; H02H 9/041
USPC ............................................ 361/56
See application file for complete search history.

(56) References Cited

U.S. PATENT DOCUMENTS

| 7,054,127 | B1 | 5/2006 | Scearce et al. |
| 7,864,491 | B1* | 1/2011 | Bauder ............... H01H 9/30 361/13 |
| 2007/0109697 | A1 | 5/2007 | Huh |
| 2010/0254062 | A1 | 10/2010 | Chan |
| 2013/0229068 | A1 | 9/2013 | Sanders, III et al. |

FOREIGN PATENT DOCUMENTS

EP    2045823 A2    8/2009

OTHER PUBLICATIONS

Extended European Search Report, May 4, 2015, 7 pages, EP Application No. 14197555.7, European Patent Office, Germany.

* cited by examiner

*Primary Examiner* — Thienvu Tran
*Assistant Examiner* — Kevin J Comber
(74) *Attorney, Agent, or Firm* — Marger Johnson

(57) ABSTRACT

A switch protection circuit includes a discharging circuit and, optionally, a clamping circuit. The discharge circuit operates prior to the switch completing the switching action to discharge capacitance from a signal line of a cable connected to a device under test to a ground voltage. When not discharging, the discharge circuit presents low leakage to a measurement circuit so as not to interfere with such measurement. If present, the clamping circuit clamps a signal line of the cable to a guard structure of the cable so that the discharge circuit can couple both the signal line and the guard structure to ground. The protection circuit operates without significantly worsening low current performance of the measurement instrument.

11 Claims, 5 Drawing Sheets

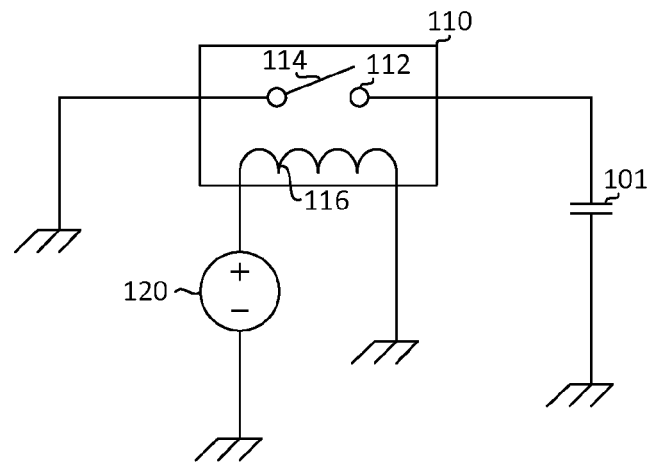
FIG. 1
(Conventional)

HOT SWITCH PROTECTION CIRCUIT

CROSS-REFERENCE TO RELATED APPLICATIONS

This application claims benefit of U.S. Provisional Patent Application No. 61/915,910, filed Dec. 13, 2013, entitled "RELAY HOT SWITCH PROTECTION CIRCUIT."

FIELD OF THE INVENTION

This disclosure is directed to protection circuits, and, more particularly, to protection circuits for switch systems that use switches such as electromechanical relays to connect test instruments to devices under test (DUTs).

BACKGROUND

Typically, test systems that use switches such as electromechanical relays to connect test instruments to DUTs have many more device terminals than instruments, and a given DUT only has a few terminals. Therefore, any given test typically has many unused pins. These unused pins are still connected to DUT terminals, but the pins are not driven by instruments during the test. Each unused pin has capacitance due to cables and DUT terminals. For a variety of reasons relating to DUT arrangement, there may be undesired parasitic connections between the test pins and unused pins, which can cause these unused pin capacitances to be charged up to high test voltages.

If the voltage on an unused pin is not discharged before initiating the next test, and the pin is used in the next test in a test sequence, as the relay opens or closes, the energy stored in this capacitance will suddenly discharge through the relay contact. This is called "hot-switching." Hot-switching can deteriorate the relay contact, leading to early relay failure.

Ordinarily, an instrument could discharge this capacitance before running a test. However, in such a switch system there is no way of connecting an instrument to a charged pin without causing the relay to hot switch. Also, there is no easy way to know that the other side of the relay is at a voltage sufficient to induce hot switching.

Since the energy stored in an unused test system cable or DUT capacitance increases in proportion to the square of the voltage, and this energy is directly responsible for damaging the relay contacts, this is an important problem in higher voltage test systems, which are becoming more widely used to test high voltage devices.

Embodiments of the invention prevent hot-switching without degrading low current performance, and address other limitations of the prior art.

SUMMARY OF THE DISCLOSURE

Embodiments of the invention include a protection circuit coupled to a switch in a system coupled to a device under test through a cable, such as a coaxial or triaxial cable, each of which includes a signal line. The protection circuit includes a trigger signal receiver that receives a signal before the switch changes states. The protection circuit includes a discharge circuit that electrically couples the signal line of the cable to a pre-determined voltage, in response to receiving the trigger signal and before the switch finishes changing operating states.

In embodiments where the system is coupled to a triaxial cable, the protection circuit may further include a clamping circuit structured to electrically couple the signal line of the cable to the guard structure of the cable after the clamping circuit receives the trigger signal.

When not in a discharge mode, the protection circuit may instead isolate the signal line from the pre-determined voltage.

Other embodiments include methods of operation.

BRIEF DESCRIPTION OF THE DRAWINGS

FIG. 1 is a circuit diagram illustrating the principle causing switch or relay damage that embodiments of the invention address.

DETAILED DESCRIPTION

Figure 2:
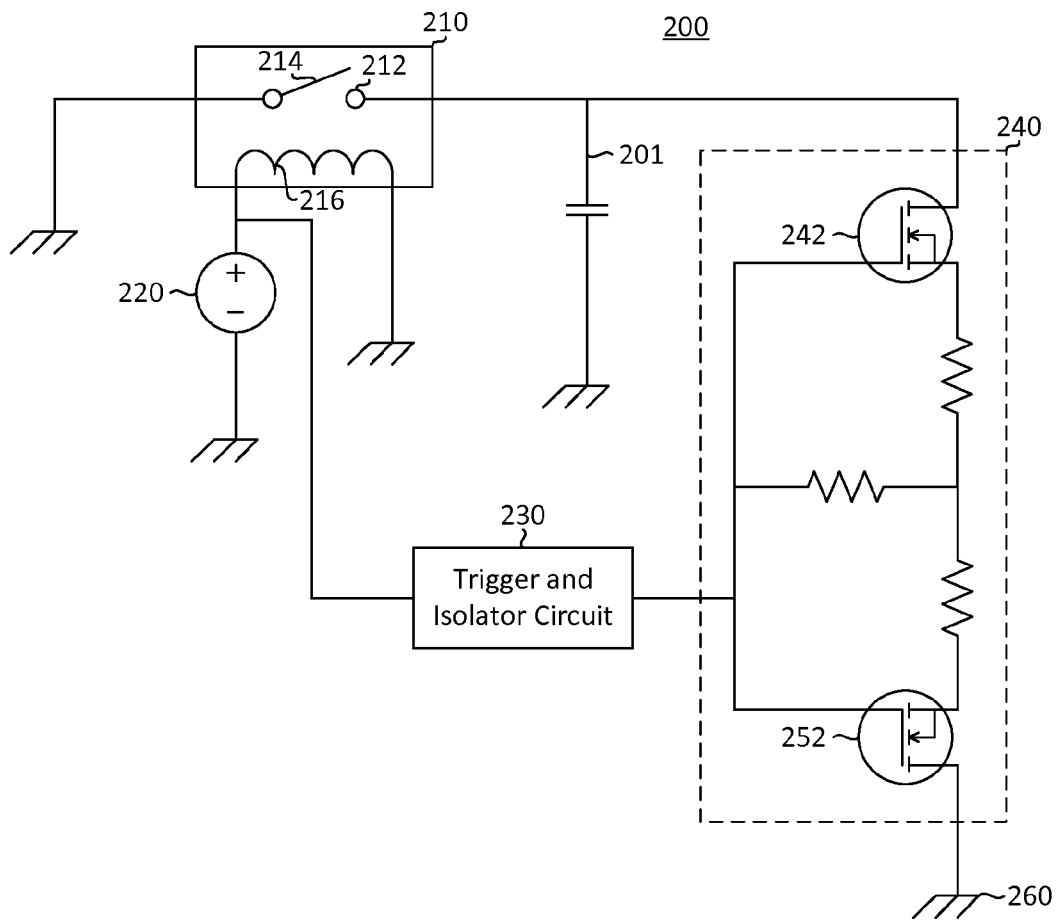
FIG. 2 is a partial circuit diagram of a hot switch protection circuit according to embodiments of the invention.

Embodiments of the invention prevent hot-switching by automatically discharging the voltage present on one side of the relay, thereby eliminating the possibility of hot switching. This is accomplished by use of a secondary solid state switch, which is not damaged by hot switching. This solution prevents such hot switching while at the same time does not significantly worsen low current performance. This is important since typically one test system must be capable of testing both high voltage and low current, and also must have reliable relay contacts.

FIG. 1 depicts the problem addressed by embodiments of the invention. A capacitor 101 is coupled to a relay 110, which includes an electrical contact 112 and a movable armature 114. The armature may be energized by a coil 116, when the coil is driven by a voltage source 120. If the capacitor 101 is charged to a voltage when the contact 112 in relay 110 closes, then the capacitor 101 will suddenly discharge through the relay as the contact opens or closes, causing arcing and deterioration of the contact 112 in the relay 110. Note that the capacitor 101 may represent an actual capacitor, or it may instead represent the parasitic capacitance present on cables connected to the relay contact.

One method to prevent capacitive charging would be to place a resistor in parallel with the capacitor 101. However, this will compromise measurement performance when the terminal is connected to a DUT during a test if the resistance is too low, and will be unable to discharge the capacitor 101 quickly if the resistance is too high.

Another solution would be to replace the relay 110 with a relay capable of hot switching. Unfortunately, low-current test systems as well as high-voltage test systems often require relays that are not capable of hot switching. Additionally, relays capable of hot switching are often physically larger than relays that are not. Therefore, using these kinds of relays is a disadvantage in a high density switch matrix.

A third solution would be to simply detect that there is voltage present across the capacitor 101 and prevent relay switching until this voltage decays to a low enough level. The first problem with this solution is that, in some cases depending on design of a coil control circuit, delaying the coil signal may not be possible. Second, even if it were possible, the time required for the voltage on the capacitor 101 to naturally decay will cause the overall switch system to have undesirably slow switching performance.

FIG. 2 is a partial circuit diagram of a relay hot switch protection circuit 200 according to embodiments of the invention. FIG. 2 depicts the case of a normally open relay 210. A voltage from voltage source 220 changes from low to high voltage to energize a coil 216 of the relay 210 and close a primary contact 212. This change serves as a trigger to a trigger and isolation circuit 230, which, upon triggering, closes a secondary discharge switch 240 that is not damaged by hot-switching. In this embodiment, transistors 242 and 252 discharge the capacitor 201 to a ground 260. The entire discharge action happens through the secondary switch 240 between the time it takes for the voltage from the voltage source 220 to change and for the relay 210 to actually close the contact 212 by moving the armature 214.

Another important feature of the circuit 200 to support low current measurements is that, in the embodiment shown in FIG. 2, which uses transistors 242, 252 as the discharge switches of the discharge switch 240, the circuit to drive the transistors 242, 252 is isolated from the trigger and coil circuitry of the relay 210. If the circuit were not isolated, the large voltage difference across the discharge switch 240 could induce a significant offset current on a guard of a triaxial cable coupled between the instrument and the DUT. In such a case, the offset current between the signal pin and guard of the triaxial cable would compromise low current measurement performance.

Figure 3:
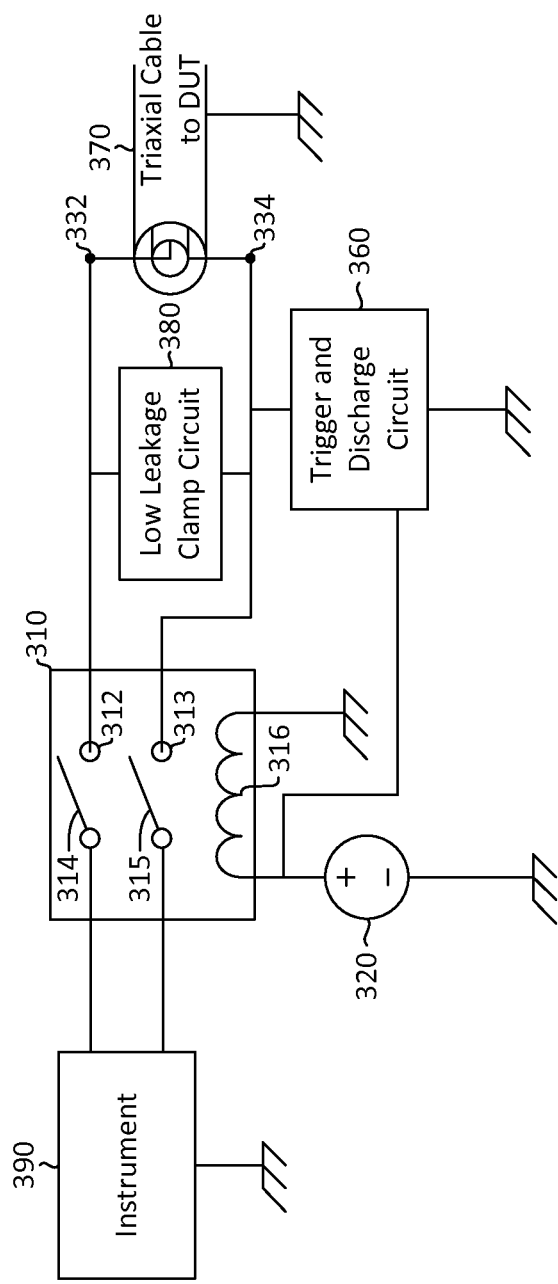
FIG. 3 is a functional block diagram illustrating how embodiments of the invention support low-current measurements.

An additional important feature of this example circuit is that it is supports low-current measurements. FIG. 3 shows this arrangement. Here a relay 310 is a two-contact relay that switches a guard and center pin of a low-current triaxial cable 370. The contact 312 is coupled to a node 332, which is coupled to the signal pin of the triaxial cable 370, while the contact 313 is coupled to a node 334, which is coupled to the guard of the triaxial cable 370. To automatically discharge the effective capacitance of the triaxial cable 370, while not contributing to leakage of the triaxial center pin, a low leakage clamp circuit 380 connects the center pin to the triaxial guard.

For low current performance during testing, the switch 310 is closed and an instrument 390 drives the node 334 to a voltage very close to the signal at the node 332. During this time, the clamp circuit 380 should preferably not activate, and therefore incur only low leakage between the nodes 332, 334. When not testing, the switch 310 is open, and no instrument is directly driving the node 334. However, the center pin may be connected through a DUT and charged to a voltage. Just before the switch 310 closes again for another test, the clamp circuit 380 activates, thereby ensuring that the guard voltage moves along with the center pin. At approximately the same time, the discharge circuit within the trigger and discharge circuit 360 engages, and the clamp circuit 380 and the discharge circuit within the trigger and discharge circuit 360 together provide a low impedance path for discharge of the both the center pin and the guard to ground.

Figure 4:
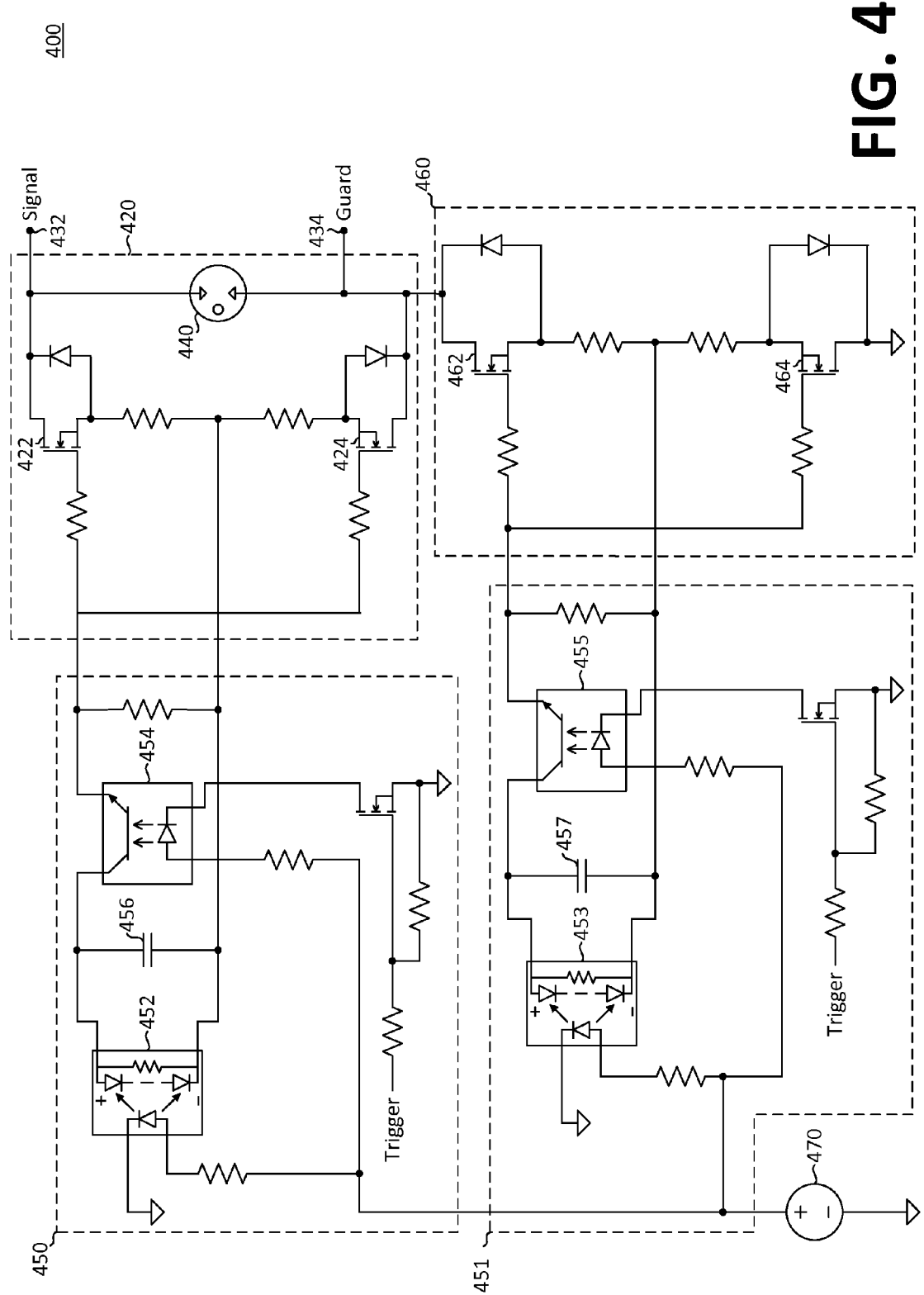
FIG. 4 is a detailed circuit diagram illustrating a hot switch protection circuit according to embodiments of the invention.
Figure 5:
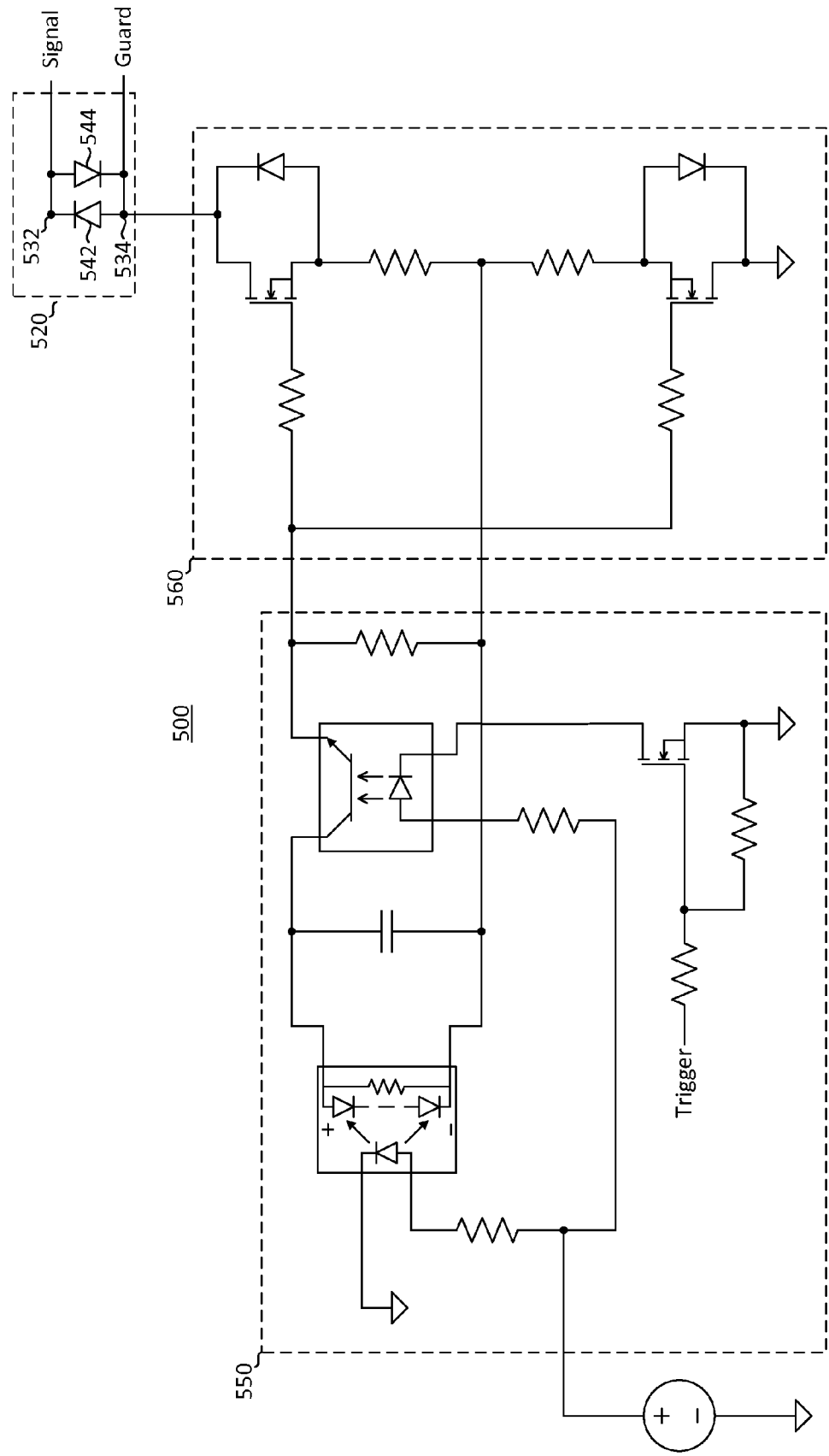
FIG. 5 is a detailed circuit diagram illustrating a hot switch protection circuit according to other embodiments of the invention.

There are several potential embodiments of the low leakage clamp circuit 380 of FIG. 3. FIG. 4 shows one embodiment in which a low leakage clamp circuit is constructed with a MOSFET switch in parallel with a gas discharge tube. FIG. 5 shows an embodiment where the low leakage clamp circuit is formed from low-leakage, anti-parallel diodes. There are other possible clamp circuit embodiments. Thus, embodiments of the invention discharge the guard pin, and also the center pin, to ground when triggered by a relay control signal.

In more detail, the clamp and discharge circuit 400 of FIG. 4 is a detailed example of a clamp and discharge circuit that was illustrated in FIG. 3. The clamp and discharge circuit 400 includes a node 432 that may be coupled to the center wire or signal pin of a triaxial cable (not illustrated), as well as a node 434 that may be coupled to a guard of the triaxial cable. In other embodiments the clamp and discharge circuit may be instead coupled to a coaxial cable, such as described with reference to FIG. 6 below.

The clamp and discharge circuit 400 includes four sections, or portions, with each section performing a different function. A clamp circuit portion 420 operates in concert with a discharge circuit portion 460 to make a protection circuit for a switch or relay coupled to the signal and guard nodes 432, 434. In a protection, or discharge mode, the clamp circuit portion 420 electrically couples the signal and guard nodes 432, 434 together, or closely together, and the discharge circuit 460 couples the nodes to a reference voltage, such as a ground voltage. In a low-leakage mode, the clamp circuit 420 and discharge circuit 460 operate to minimize any current leakage between the signal and guard nodes 432, 434 to ground. A clamp activating circuit 450 drives the clamp circuit 420, while a discharge activating circuit 451 drives the discharge circuit 460. In the embodiment illustrated in FIG. 4, the activating circuits 450, 451 are identical, although in some embodiments they may be different.

In operation, when the signal and guard nodes 432, 434 are driven by an instrument, the transistors 422, 424 are in a low-leakage state between the nodes 432, 434. The gas discharge tube 440 similarly provides low-leakage. In this mode, transistors 422 and 424 are OFF, and the nodes 432, 434 are driven by the instrument to nearly the same voltage, resulting in very little current leakage. Instead, when the circuit 400 is in a discharge mode, transistors 422, 424 turn ON, causing the circuit 400 to short the signal node 432 to the guard node 434 through the transistors 422, 424. In the low-leakage mode, the gas discharge tube 440 protects transistors 422, 424 by limiting the voltage across them when the DUT charges up the signal and guard nodes 432, 434, while adding little additional current leakage at low voltage.

As mentioned above, the clamp circuit 420 and discharge circuit 460 of the clamp and discharge circuit 400 operates in two modes. In the discharge mode, a trigger signal in the clamp activating circuit 450 and in the discharge activating circuit 451 transitions state, for example from LOW to HIGH. This causes optically coupled switches 454 and 455 to turn ON, which in turn provides voltage stored on a capacitor 456 to gates of transistors 422 and 424 in the clamp circuit 420, and further provides voltage stored on a capacitor 457 to gates of transistors 462 and 464 in the discharge circuit 460. This causes the transistors 422, 424, 462, and 464 to turn ON, which closely couples the signal and guard nodes 432, 434 to one another through the clamp circuit 420, and further closely couples the nodes to a ground voltage through the discharge circuit 460. Capacitors 456 and 457 are sized large enough to drive their respective transistors without significant loss of voltage.

In this way, the discharge mode operates to protect the switch or relay that is coupled between the instrument and the DUT that is connected to the signal and guard nodes 432, 434. More specifically, the discharge mode is activated as the relay is closing, or before the relay closes, so that any stray voltage from the DUT is discharged to ground before the relay closes. This protects the relay contacts from degradation. When used to protect a switch, the discharge mode drains any stray voltage from the switch itself so that high current or high voltage does not exceed the capacity of the switch when it is being turned on or off. The discharge mode operates within a short time window, starting just before the relay or switch changes state and ending after the switch finishes changing state. In one example embodiment, where the switch is a mechanical relay, it takes the relay somewhere between several hundred microseconds and several milliseconds to change states. In such a case, the discharge circuit 460 begins discharging before the relay switches states. In some embodiments the discharge circuit 460 may change from the discharge state to the low-level state before or as the relay finishes switching states. In this way the discharge circuit 460 has completed reducing voltage on the relay contact to ground or near ground before the relay contact closes. In other embodiments the discharge circuit 460 may remain in the discharge state for several hundreds of microseconds up to several milliseconds after the relay has completed switching states, which ensures protection during a time the relay may be experiencing bounce.

When the discharge mode is not activated, the clamp circuit 420 and discharge circuit 460 operate in a low-leakage mode. In the low-leakage mode, the clamp circuit 420 and discharge circuit 460 operate to minimize any effect their presence has on signals from the DUT. More specifically, in the low-leakage mode, optically coupled switches 454 and 455 open, which disconnects capacitors 456 and 457 from their respective transistors 422, 424 and 462,464. Over time, gate voltage will decay from the transistors 422,424, 462, 464 which turns the transistors OFF.

Another potential embodiment of the low leakage clamp 380 illustrated in FIG. 3 is a clamp circuit portion 520 of the circuit 500 shown in FIG. 5. Here, the clamp includes a pair of anti-parallel diodes, 542, 544 coupled between a signal node 532 and a guard node 534. In this arrangement, when an instrument coupled to the nodes 532, 534 drives the signal node 532, the instrument will also drive the guard 534 to a voltage nearly the same as the signal node 532. The low-leakage diodes 542, 544 will add little leakage between the nodes 532, 534. In the discharge mode, when signal node 532 is not being used for testing but still charged up by virtue of being connected to a DUT connection, one of the two diodes 542, 544 will conduct, effectively connecting the center pin coupled to the signal node 532 to the guard node 534, and allowing the circuit to discharge the center pin of a triaxial cable coupled to the instrument. There may be a small, residual, voltage on the diode remaining, but such a voltage usually does not represent enough energy to damage a switch or a relay contact.

As with the embodiment illustrated in FIG. 4, a discharge activating circuit 550 drives a discharge circuit 560. Unlike FIG. 4, however, only one activating circuit 550 is illustrated, although implemented embodiments may include two such circuits, as illustrated in FIG. 4.

Figure 6:
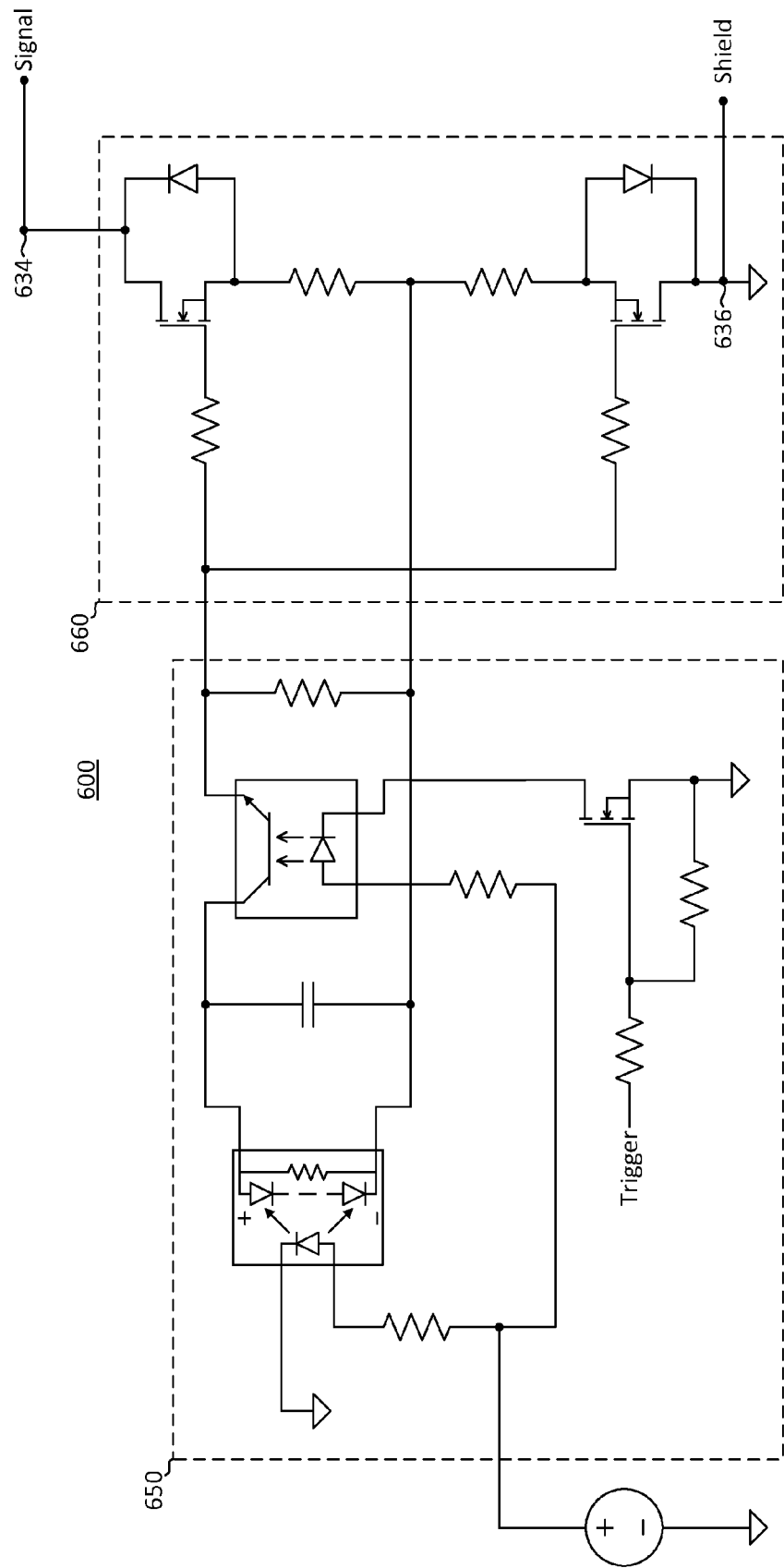
FIG. 6 is a detailed circuit diagram illustrating a relay switch protection circuit according to yet other embodiments of the invention.

FIG. 6 is a detailed circuit diagram illustrating a hot switch protection circuit 600 according to yet other embodiments of the invention. The protection circuit 600 is coupled to a coaxial cable, rather than the triaxial cables illustrated in FIGS. 3-5. Because in a coaxial cable there is no guard structure, there is no need to include a clamp circuit in the protection circuit 600. The protection circuit 600 couples a signal node 634 to the signal or center pin of the coaxial cable. In some embodiments, such as illustrated in FIG. 6, the shield of the coaxial cable may be coupled to a ground voltage at a node 636.

Although specific embodiments of the invention have been illustrated and described for purposes if illustration, it will be understood that various modifications may be made without departing from the spirit and scope of the invention. Accordingly, the invention should not be limited except as by the appended claims.

What is claimed is:

1. A protection circuit coupled to a mechanical relay switch in a test instrument, the test instrument structured to couple to a device under test through a cable that includes a signal line, the protection circuit comprising:
    a trigger signal receiver that receives a trigger signal before the mechanical relay switch changes states; and
    a discharge circuit structured to electrically couple the signal line of the cable to a pre-determined voltage in response to receiving the trigger signal and before the mechanical relay switch finishes changing operating states, the discharge circuit including:
        a first MOSFET transistor and a second MOSFET transistor having source terminals coupled to one another, a drain of the first transistor coupled to the signal line of the cable, and a drain of the second transistor coupled to the pre-determined voltage, and the drain of the first transistor coupled to the signal line of the cable through a clamping circuit structured to electrically couple the signal line of the cable to a guard structure of the cable after the clamping circuit receives the trigger signal.

2. The protection circuit according to claim 1, further comprising:
    a clamping circuit structured to electrically couple the signal line of the cable to the guard structure of the cable after the clamping circuit receives the trigger signal.

3. The protection circuit according to claim 2, in which the clamping circuit comprises:
    a complementary diode structure having an anode of a first diode and a cathode of a second diode coupled to the signal line of the cable, and having an anode of the second diode and a cathode of the first diode coupled to the guard structure of the cable.

4. The protection circuit according to claim 2 in which the clamping circuit comprises:
    a first MOSFET transistor and a second MOSFET transistor having source terminals coupled to one another, a drain of the first transistor coupled to the signal line of the cable, and a drain of the second transistor coupled to the guard structure of the cable.

5. The protection circuit according to claim 4, further comprising:
    a gas discharge tube electrically coupled between the signal line and the guard structure of the cable.

6. The protection circuit according to claim 1 in which the discharge circuit, when not electrically coupling the signal line of the cable to the pre-determined voltage, instead isolates the signal line from the pre-determined voltage.

7. The protection circuit according to claim 1 in which the first MOSFET transistor comprises more than one transistor, and in which the second MOSFET transistor comprises more than one transistor.

8. A protection circuit coupled to a mechanical relay switch in a test instrument, the test instrument structured to couple to a device under test through a cable that includes a signal line, the protection circuit comprising:
  a trigger signal receiver that receives a trigger signal before the mechanical relay switch changes states; and
  a discharge circuit structured to electrically couple the signal line of the cable to a pre-determined voltage in response to receiving the trigger signal and before the mechanical relay switch finishes changing operating states, the discharge circuit including:
    a first MOSFET transistor and a second MOSFET transistor having source terminals coupled to one another, a drain of the first transistor coupled to the signal line of the cable, and a drain of the second transistor coupled to the pre-determined voltage; and
    a capacitor coupled to the gate terminals of the first and second MOSFET transistors, and in which the capacitor is switchably coupled to the gate terminals based on a state of the trigger signal.

9. A method of protecting an electromechanical relay switch from damage during a switching event, the electromechanical relay switch part of a test instrument system and structured to couple through a cable to a device under test, the method comprising:
  sensing a switching event is imminent;
  connecting a switch node to a pre-determined voltage through a discharging circuit prior to the switching event occurring, the pre-determined voltage selected to prevent damage to the electromechanical relay switch;
  electrically coupling a signal line of the cable and a guard structure of the cable to one another by:
  engaging a clamping circuit comprising two serially coupled MOS transistors that have their sources coupled to one another, the clamping circuit, when operated, structured to electrically couple the signal line of the cable to the guard structure of the cable; and
  connecting the electrically coupled signal line and guard structure to the pre-determined voltage.

10. The method of protecting a electromechanical relay switch from damage during a switching event according to claim 9, in which connecting a switch node to a pre-determined voltage through a discharging circuit comprises: engaging a discharging circuit comprising two serially coupled MOS transistors that have their sources connected to one another, the discharging circuit, when operated, structured to couple the switch node to a ground reference.

11. The method of protecting a electromechanical relay switch from damage during a switching event according to claim 9, in which connecting a switch node to a pre-determined voltage through a discharging circuit prior to the switching event occurring comprises connecting the switch node to the pre-determined voltage through the discharging circuit prior to the switching event completing.

\* \* \* \* \*